(12) United States Patent
Gilotte et al.

(10) Patent No.: US 10,569,643 B2
(45) Date of Patent: Feb. 25, 2020

(54) MOTOR VEHICLE FRONT SURFACE WITH CENTRAL AIR INLET AND SIDE OUTLETS

(71) Applicant: Compagnie Plastic Omnium, Lyons (FR)

(72) Inventors: Philippe Gilotte, Benonces (FR); Martin Struss, Bratislava (SK)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 15/319,011

(22) PCT Filed: Jun. 19, 2015

(86) PCT No.: PCT/FR2015/051627
§ 371 (c)(1),
(2) Date: Dec. 15, 2016

(87) PCT Pub. No.: WO2015/197952
PCT Pub. Date: Dec. 30, 2015

(65) Prior Publication Data
US 2017/0144533 A1    May 25, 2017

(30) Foreign Application Priority Data
Jun. 27, 2014   (FR) .................... 14 56050

(51) Int. Cl.
*B60K 11/08* (2006.01)
*B60T 5/00* (2006.01)
(Continued)

(52) U.S. Cl.
CPC ............ *B60K 11/085* (2013.01); *B60K 11/04* (2013.01); *B60K 11/08* (2013.01); *B60T 5/00* (2013.01); *B62D 25/085* (2013.01); *F01P 1/06* (2013.01)

(58) Field of Classification Search
CPC ....... B60K 11/085; B60K 11/08; B60K 11/04; B62D 25/085; Y02T 10/88; B60T 5/00; F01P 1/06; F01P 7/10
See application file for complete search history.

(56) References Cited

U.S. PATENT DOCUMENTS

| 4,653,788 A * | 3/1987 | Di Giusto | ............. B60K 11/08 188/264 A |
| 4,723,594 A * | 2/1988 | Koehr | ................... B60K 11/04 123/196 AB |

(Continued)

FOREIGN PATENT DOCUMENTS

| CN | 102729803 A | 10/2012 |
| CN | 103347726 A | 10/2013 |

(Continued)

OTHER PUBLICATIONS

International Search Report PCT/ISA/210 for International Application No. PCT/FR2015/051627 dated Mar. 11, 2016.

(Continued)

*Primary Examiner* — James A Shriver, II
*Assistant Examiner* — Steve Clemmons
(74) *Attorney, Agent, or Firm* — Harness, Dickey & Pierce, P.L.C.

(57) ABSTRACT

Motor vehicle front surface including a central air-moving device, wherein the central air-moving device is connected laterally to at least one side air-moving device leading air from a central part of the front surface towards at least one side part of the vehicle, and in that the front surface comprises at least one valve between the central air-moving device and the side air-moving device, making it possible to adjust the air flow circulating between the central air-moving device and the side air-moving device.

11 Claims, 5 Drawing Sheets

(51) Int. Cl.
  *B60K 11/04* (2006.01)
  *B62D 25/08* (2006.01)
  *F01P 1/06* (2006.01)

(56) References Cited

U.S. PATENT DOCUMENTS

| | | | | |
|---|---|---|---|---|
| 8,091,516 B2* | 1/2012 | Preiss | ............... | B60K 11/04 123/41.05 |
| 8,544,581 B2* | 10/2013 | Stokes | ............... | B60R 19/48 180/68.1 |
| 2006/0211364 A1* | 9/2006 | Brotz | ............... | B60K 11/08 454/261 |
| 2011/0308763 A1* | 12/2011 | Charnesky | ......... | B60H 1/3227 165/41 |
| 2012/0168125 A1* | 7/2012 | Johnston | ............ | F28F 27/02 165/96 |
| 2012/0248824 A1 | 10/2012 | Fujiu et al. | | |
| 2013/0316634 A1 | 11/2013 | Ajisaka | | |
| 2015/0322845 A1* | 11/2015 | Nam | ............... | F02B 29/0443 123/41.21 |
| 2015/0345578 A1* | 12/2015 | Nightingale | ........ | B60K 11/085 188/264 AA |
| 2017/0136872 A1* | 5/2017 | Ribaldone | .......... | B60K 11/085 |

FOREIGN PATENT DOCUMENTS

| | | | | |
|---|---|---|---|---|
| DE | 10159783 A1 | | 6/2003 | |
| DE | 102008022554 A1 | * | 11/2009 | ............ B60K 11/08 |
| DE | 102012111274 A1 | | 5/2014 | |
| EP | 0175655 A1 | * | 3/1986 | ............ B60K 11/08 |
| FR | 2904950 A1 | | 2/2008 | |
| JP | S61149727 U | | 9/1986 | |
| JP | 2005-178427 A | | 7/2005 | |
| JP | 2008-049815 A | | 3/2008 | |

OTHER PUBLICATIONS

Written Opinion of the International Searching Authority PCT/ISA/237 for International Application No. PCT/FR2015/051627 dated Mar. 11, 2016.
French Search Report for French Application No. FR1456050 dated Feb. 25, 2015.
French Written Opinion for French Application No. FR1456050 dated Feb. 25, 2015.
Chinese Office Action dated Aug. 1, 2018 issued in corresponding Chinese Application No. 201580034861.4 (with translation).

* cited by examiner

MOTOR VEHICLE FRONT SURFACE WITH CENTRAL AIR INLET AND SIDE OUTLETS

CROSS-REFERENCE TO RELATED APPLICATIONS

This application is the U.S. National Phase application of PCT Application No. PCT/FR2015/051627 filed on Jun. 19, 2015, which claims priority to French Application No. 1456050 filed on Jun. 27, 2014, the contents of each of which are incorporated herein by reference.

This invention relates to a motor vehicle front surface, in particular of the type having air inlets for cooling the vehicle engine.

A motor vehicle front surface refers to a set of components located in front of the air coolers, comprising at least the bumper.

A front surface may further comprise: shock elements (absorbers), a beam, fairing elements, air guide elements, front wings, mud guard (wheel arch), etc.

Motor vehicle front surfaces having cooling air inlets which are provided at the front of motor vehicles to cool the engine are known. The cooling air inlet is sometimes decorated with a grid which has a purely aesthetic role.

In general, cooling is carried out by means of an air/coolant exchanger, also called a radiator, and/or an intercooler.

These two devices must be supplied by an air flow from the outside to allow them to perform their cooling function.

The radiator is generally supplied by means of a central cooling air inlet, while the intercooler is generally supplied by means of a side cooling air inlet, on the front of the bumper.

However, it has been demonstrated that these central and side cooling air inlets may have an adverse effect on the vehicle air penetration (drag) coefficient Cx.

In order to reduce the penetration coefficient, while keeping the cooling air inlets, it is known to equip the front surface laterally with aerodynamic air inlets, to direct the air flow reaching the front surface, towards side parts of the bumper to come out at the front wheels of the vehicle.

However, these aerodynamic air inlets used to improve the air flow around the vehicle to improve its aerodynamics have little impact on the penetration coefficient Cx, since the pressures exerted on the side parts of the front surface are less than the pressure exerted in the central part. The air entering the central part is nevertheless used to cool the engine.

The invention seeks to provide a vehicle front surface with an alternative and improved way of reducing a penetration coefficient Cx while optimising the air inlet at the front surface. To do this, the front surface according to the invention comprises means for using the air from the central air inlet to direct it towards side parts such as the wheels. The adverse effect on the penetration coefficient Cx due to the high pressure of the air recovered in the central part of the front surface is therefore reduced.

Thus, the invention relates to a motor vehicle front surface having a surface intended to be visible from the outside of the vehicle, a central air inlet formed in the central part of said surface allowing air from outside the vehicle to enter a central air-moving means.

According to the invention, the central air-moving means is connected laterally to at least one side air-moving means directing air from the central part to at least one side part of the vehicle, and in that it comprises at least one valve between the central air-moving means and the side air-moving means, making it possible to adjust the air flow circulating between the central air-moving means and the side air-moving means.

This system considerably reduces the impact on the penetration coefficient Cx due to the high pressure of the air recovered in the central part, by means of the side air-moving means, and the valve is used to manage both the cooling air requirements and the aerodynamic requirements.

According to the invention, the first valve can be located at the intersection between the central air-moving means and the side air-moving means, so that when the first valve is closed, air from the central air-moving means cannot enter the side air-moving means.

According to one embodiment, the central air-moving means is provided with a shutter to prevent the air which entered through a central air inlet from leaving the central air-moving means towards the vehicle engine. When the first valve is closed, the shutter is open, and vice versa, when the first valve is open, the shutter is closed.

The side air-moving means may comprise at least a second valve, located between the first valve and a side air outlet, air being directed towards the vehicle engine when the second valve is closed.

According to one embodiment, the front surface comprises at least one side air inlet located between the first valve and the second valve, and allowing air from outside the vehicle to enter the side air-moving means directly to cool an intercooler.

According to another embodiment, the front surface comprises at least one side air inlet located between the second valve and the side air outlet, and allowing air from outside the vehicle to enter the side air-moving means directly to improve the vehicle aerodynamics.

According to the invention, the front surface may comprise at least one side air inlet allowing air from outside the vehicle to enter the side air-moving means directly, said inlet being provided with a scoop to direct a chosen quantity of air towards the vehicle side air outlet, or towards the intercooler.

The central air-moving means and the side air-moving means may form two plastic parts attached to each other so as to avoid any air leaks at the junction.

The central air-moving means and the side air-moving means may form the same plastic part.

The central air-moving means and/or the side air-moving means may form boxes.

According to the invention, the front surface may comprise a skin intended to be visible from outside the vehicle, and in which at least one box is closed by means of the inner wall of the skin.

The invention also relates to a vehicle comprising a front surface according to the invention.

The invention will be better understood on reading the accompanying figures, which are given solely by way of example and not limiting in any way, in which.

Figure 1:
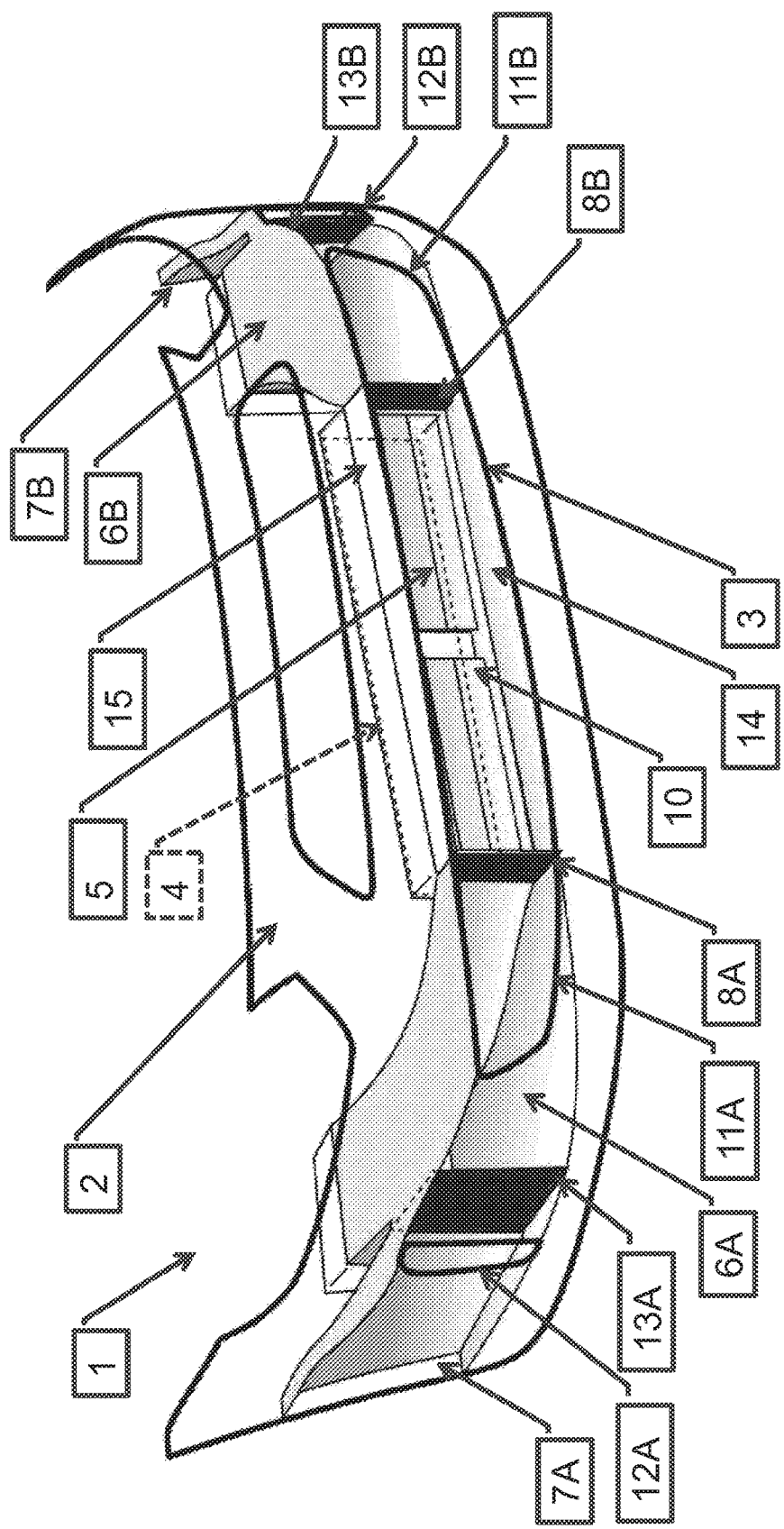
FIG. 1 illustrates an embodiment of a motor vehicle front surface according to the invention.

We now refer to FIG. 1 which illustrates an embodiment of a motor vehicle front surface (1) according to the invention.

The front surface (1) comprises a bumper skin (2) intended to be visible from the outside of the vehicle, and an air flow control device.

Figure 2:
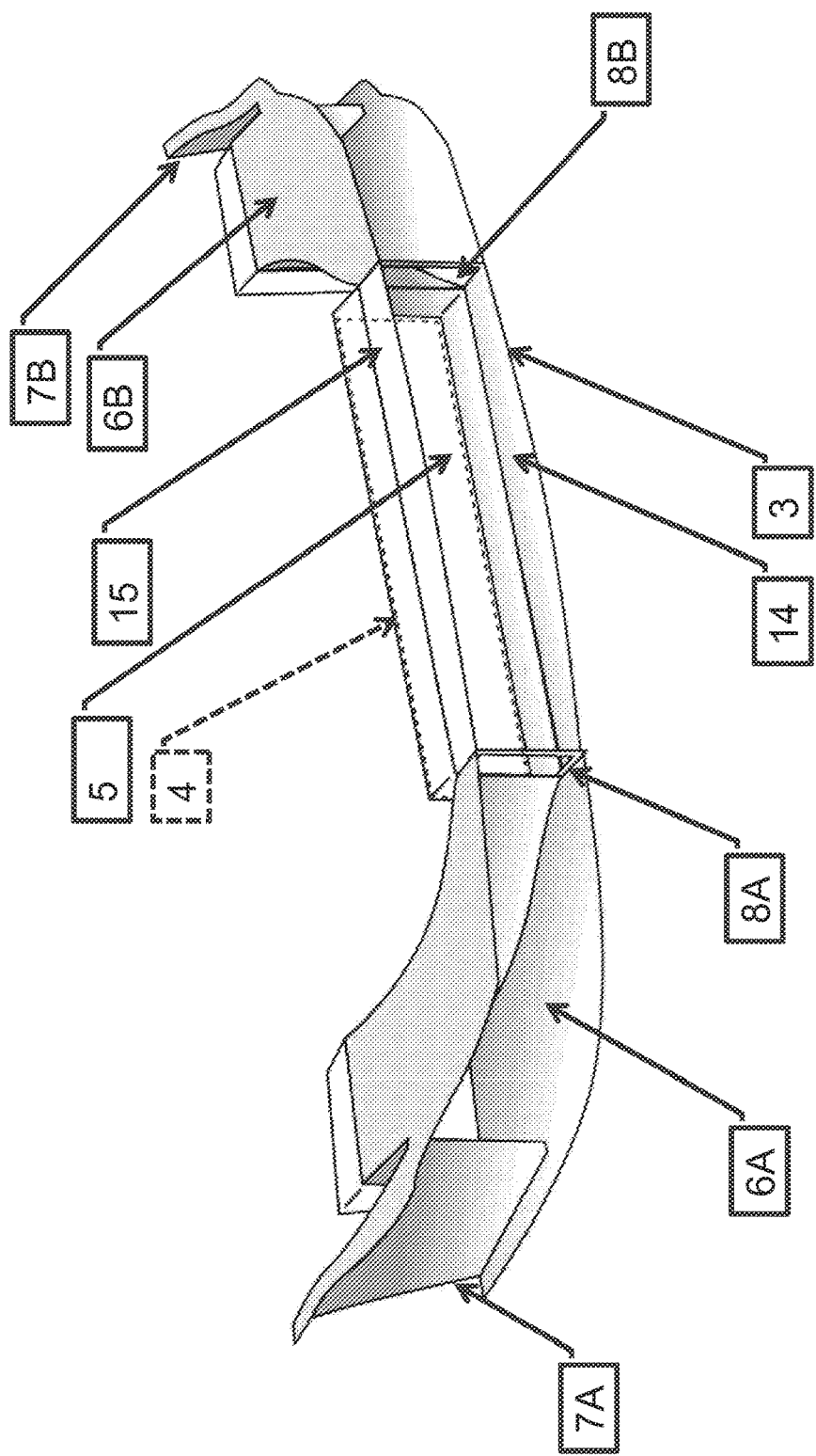
FIG. 2 illustrates an embodiment of an air flow control device according to the invention.

We now refer to FIG. 2 which illustrates an embodiment of the flow control device. The device comprises a central air inlet (3) formed in the central part of the skin (2) allowing air from outside the vehicle to enter a central air-moving means (5) formed behind said surface.

The central air-moving means (5) is connected laterally to at least one side air-moving means (6A) formed behind said surface and leading air from the central part (5) to at least one side part of the vehicle. According to the embodiment of FIG. 1, the side part may be a side air outlet (7A) of the vehicle or an intercooler.

Preferably, as illustrated on FIG. 2, the front surface (1) comprises two side air-moving means (6A, 6B). Each one leading air from the central part (5) to at least one side air outlet (7A and respectively 7B) of the vehicle.

According to one embodiment, the air-moving means form ducts.

Each side air duct (6A, 6B) comprises a first valve (8A respectively 8B) making it possible to adjust the air flow circulating between the central air duct (5) and the side air duct (6A, 6B).

When the front surface according to the invention is fitted on the vehicle, the central air inlet (3) faces the radiator, and at least one of the side air ducts (6A, 6B) goes in front of an intercooler if the vehicle has one, and the side air outlets (7A, 7B) open out at the front wheels of the vehicle.

The use of a central air inlet (3) makes it possible to recover the air in the central part of the bumper, where the aerodynamic air pressures, under driving conditions, are the highest.

According to a preferred embodiment, the first valves (8A, 8B) are located at the intersection between the central air duct (5) and the side air ducts (6A respectively 6B), so that when the first valves (8A, 8B) are closed, air from the central duct (5) cannot enter the side ducts (6A, 6B).

The central air duct (5) comprises a rear opening (4) positioned in the extension of the central air inlet (3), so as to evacuate the air which entered the central air duct (5) towards the engine. Thus, the air enters the central air duct (5), then the engine at the radiator.

Preferably, the central air duct (5) comprises a shutter (10) at the opening (4) facing the radiator. This shutter (10) prevents the air which entered the central air duct from going into the engine compartment. The control-operated shutter (10) reduces or shuts off incoming air flow when the engine, depending on the driving conditions, does not need to be cooled. Document FR 2738779 provides an example of such a shutter, in the form of a rolling blind.

The first valves (8A, 8B) are controlled by a control unit (not shown on the figures) which also centralises actuation of the shutter (10).

Preferably, when the first valves (8A, 8B) are closed, the shutter (10) is open. Consequently, the air entering the central air duct (5) comes out directly and fully through the opening (4) facing the radiator, as illustrated on FIG. 3A.

Conversely, when the first valves (8A, 8B) are open, the shutter (10) is closed. Consequently, the air entering the central air duct (5) comes out fully through the side air ducts (6A, 6B), as illustrated on FIG. 3B.

According to one embodiment, at least one of the side air ducts (6A, 6B) comprises a side opening (not shown) on its rear surface, opposite the skin (2), and facing the intercooler. Thus, the air flowing in the side air ducts (6A, 6B) can reach the intercoolers.

Figure 3A:
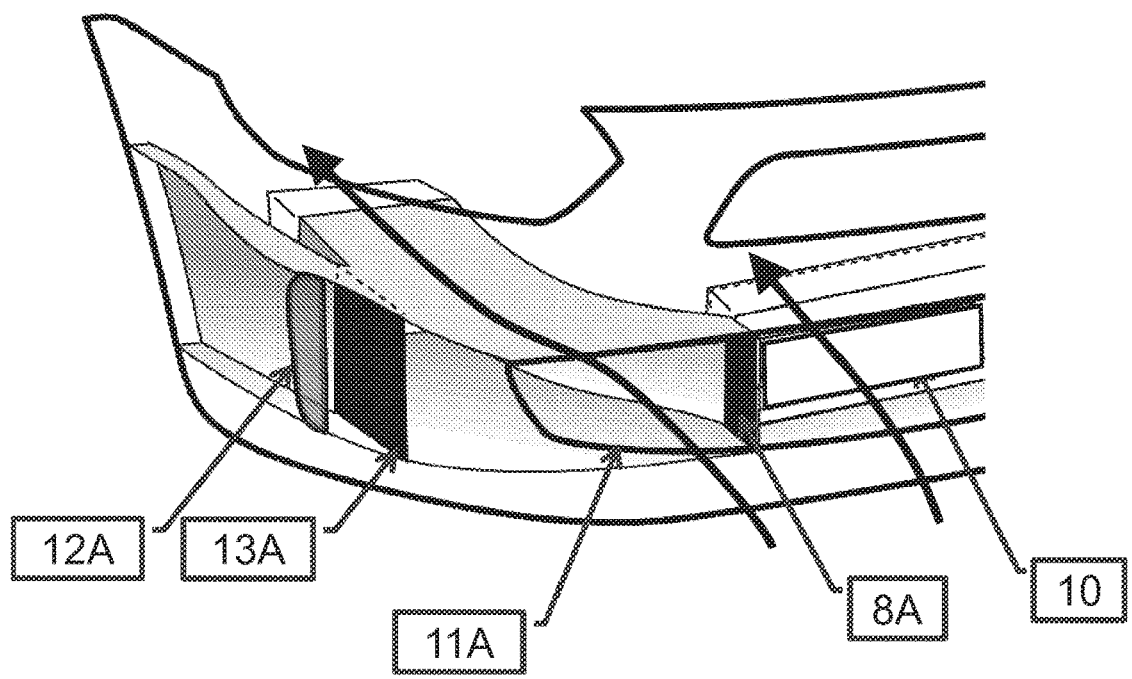
FIGS. 3A to 3D illustrate different opening and closing configurations of valves and of a shutter of an air flow control device according to the invention.
Figure 3B:
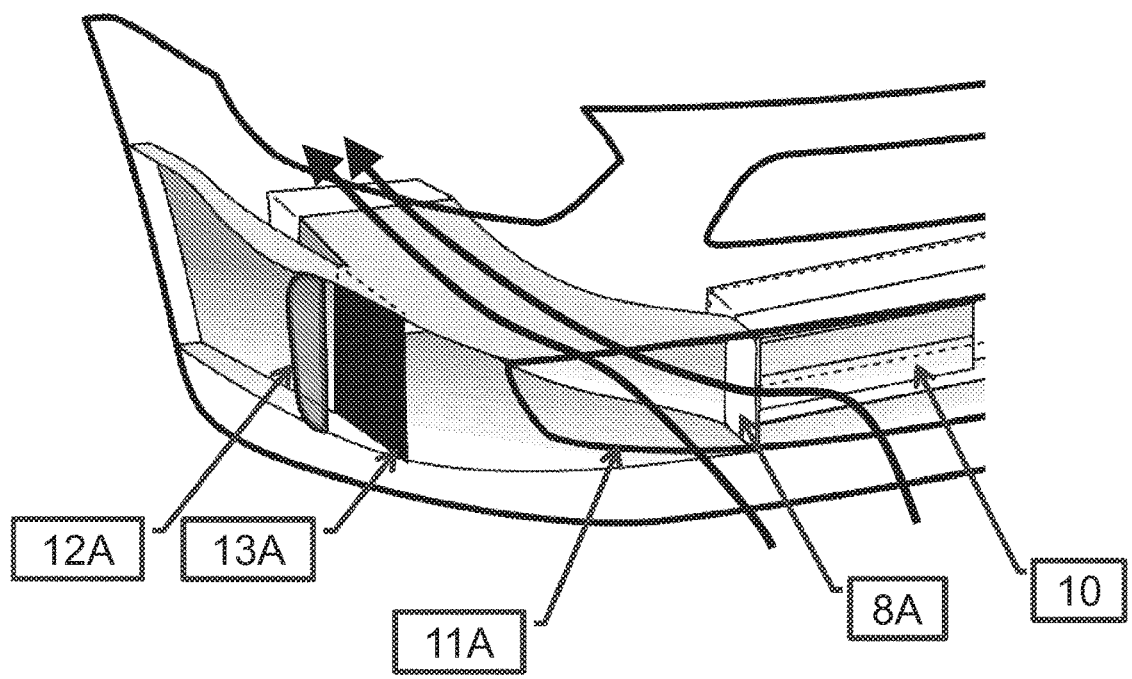

Preferably, the front surface (1) according to the invention comprises at least one side air inlet, generally two (11A, 11B), formed in the central part of the surface (2) and allowing air from outside the vehicle to enter directly opposite the intercooler. These air inlets (11A, 11B) are cooling air inlets. FIG. 3A illustrates the air flows entering through these side air inlets when the valves (8A, 8B, 13A, 13B) are closed, and FIG. 3B illustrates these air flows only when the second valve (13A, 13B) is closed. These inlets (11A, 11B) can be provided with controlled shutters.

According to another embodiment, the front surface (1) comprises at least one side air inlet, generally two (12A, 12B) and formed each side of the central inlet (3) on the skin (2), allowing air from outside the vehicle to enter the side air ducts (6A, 6B) directly, opposite the side air outlets (7A, 7B). These side air inlets (12A, 12B) are aerodynamic air inlets, as illustrated on FIGS. 3C and 3D. These inlets (12A, 12B) can be provided with controlled shutters.

According to these configurations, whether there are one or two intercoolers, flow conflicts may occur between the flow entering through the central inlet (3), the flow(s) entering through the side cooling (11A, 11B) or aerodynamic (12A, 12B) air inlet(s).

To overcome this problem and optimise the cooling of the intercooler, the side air duct (6A, 6B) preferably comprises a second valve (13A, 13B), located between the first valve (8A, 8B) and the side air outlet (7A, 7B). The first and second valves (8A, 8B, 13A, 13B) form, once closed, a duct guiding the air entering through the side air inlets (11A, 11B) towards the engine, and in particular towards the intercooler, as illustrated on FIG. 3C.

The tables below describe the possible configurations of the flow control members (shutters, valves) according to the vehicle requirements.

| Member | Configurations | | | | |
| --- | --- | --- | --- | --- | --- |
| | 1A | 1B | 1C | 1D | 1E |
| Shutter 10 | Closed | Closed | Closed | Closed | Closed |
| First valve 8A | Closed | Open | Open | Open | Open |
| Side air inlet (cooling) 11A | Open | Open | Closed | Open | Closed |
| Second valve 13A | Closed | Closed | Closed | Open | Open |
| Side air inlet (aero) 12A | Closed | Closed | Closed | Closed | Closed |

| Member | Configurations | | | | |
| --- | --- | --- | --- | --- | --- |
| | 2A | 2B | 2C | 2D | 2E |
| Shutter 10 | Closed | Closed | Closed | Closed | Closed |
| First valve 8A | Closed | Open | Open | Open | Open |
| Side air inlet (cooling) 11A | Open | Open | Closed | Open | Closed |
| Second valve 13A | Closed | Closed | Closed | Open | Open |
| Side air inlet (aero) 12A | Open | Open | Open | Open | Open |

|  | Configurations | | | | |
|---|---|---|---|---|---|
| Member | 3A | 3B | 3C | 3D | 3E |
| Shutter 10 | Open | Open | Open | Open | Open |
| First valve 8A | Closed | Open | Open | Open | Open |
| Side air inlet (cooling) 11A | Open | Open | Closed | Open | Closed |
| Second valve 13A | Closed | Closed | Closed | Open | Open |
| Side air inlet (aero) 12A | Closed | Closed | Closed | Closed | Closed |

|  | Configurations | | | | |
|---|---|---|---|---|---|
| Member | 4A | 4B | 4C | 4D | 4E |
| Shutter 10 | Open | Open | Open | Open | Open |
| First valve 8A | Closed | Open | Open | Open | Open |
| Side air inlet (cooling) 11A | Open | Open | Closed | Open | Closed |
| Second valve 13A | Closed | Closed | Closed | Open | Open |
| Side air inlet (aero) 12A | Open | Open | Open | Open | Open |

It is therefore possible to privilege cooling of the radiator or of the intercooler, or the vehicle aerodynamics.

Figure 3C:
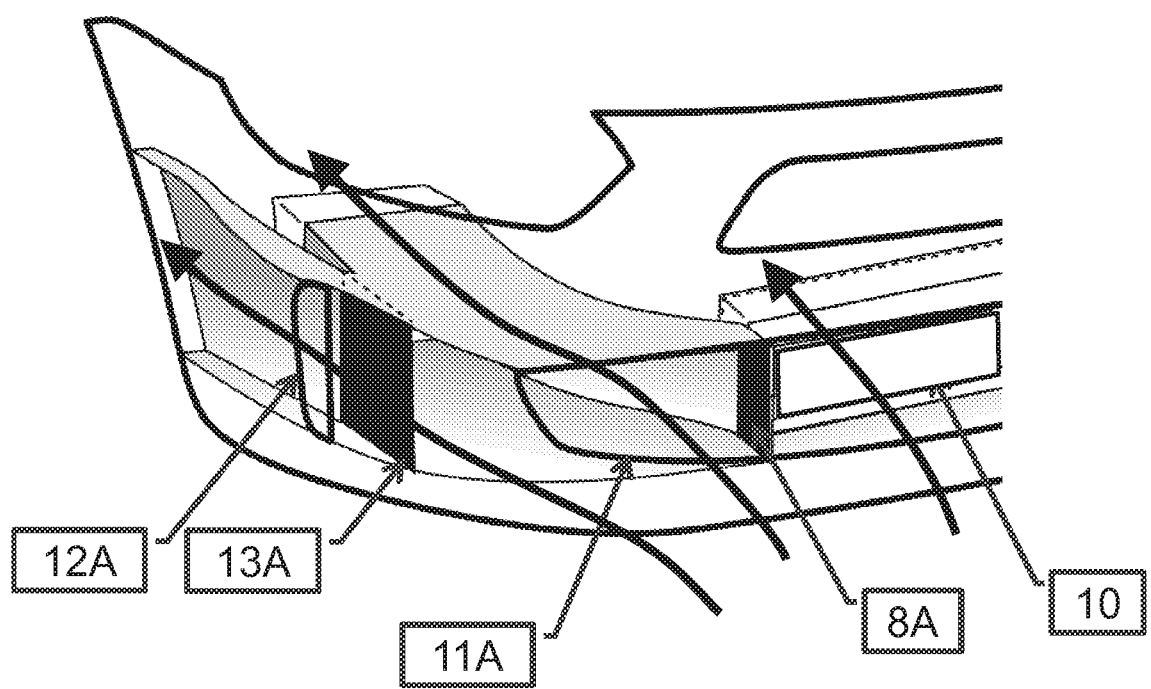
Figure 3D:
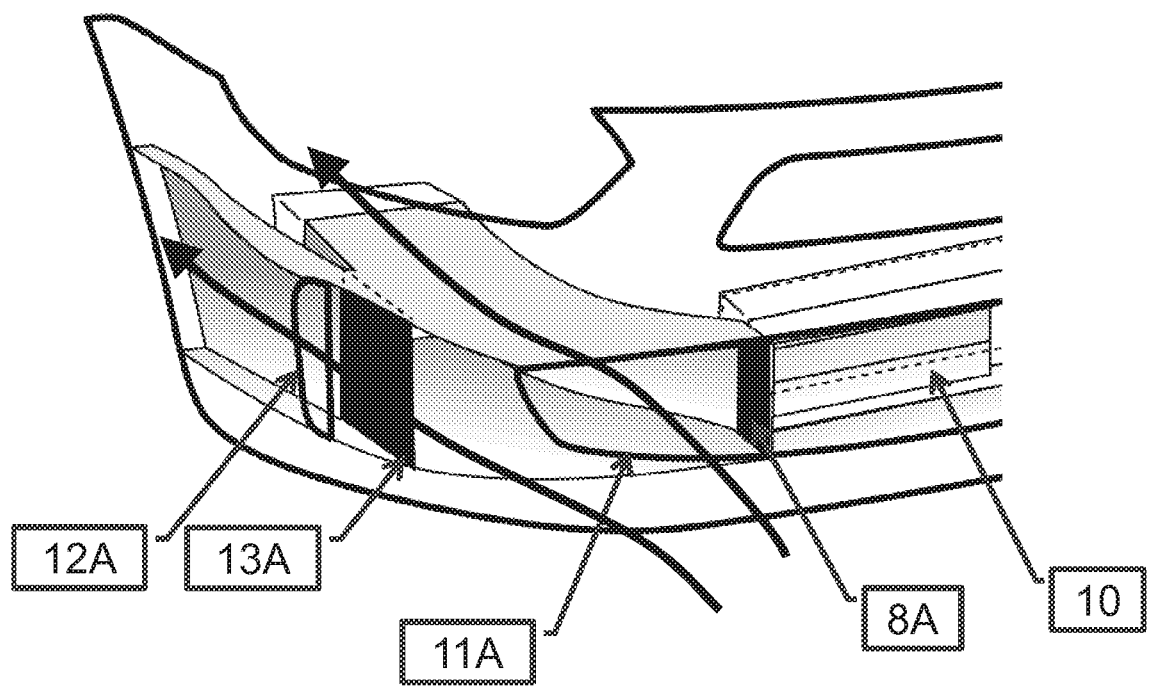

FIGS. 3A to 3D illustrate some of these configurations, in which a valve is coloured grey when closed and white when open:

FIG. 3A illustrates configuration 3A.
FIG. 3B illustrates configuration 1B.
FIG. 3C illustrates configuration 4A.
FIG. 3D illustrates configuration 2A.

Each of the flow control members (shutter, valves, etc.) is controlled by a control unit.

This control unit receives information from various sensors, such as probes. Then, based on this information (e.g. radiator temperature), the unit will decide how to direct the flows in the most appropriate way to: favour cooling of the radiator and/or of the intercooler, or favour the vehicle aerodynamics.

To do this, the control unit controls the valves, for example by pivoting about a vertical axis located on one of the valve edges.

The air control device of the front surface according to the invention therefore comprises at least:
a central air-moving means (5) comprising:
an opening (4) positioned opposite the central air inlet (3) to direct air to the radiator.
A lower wall (14)
An upper wall (15)
a side air-moving means (6A, 6B);

The central air-moving means (5) may form a box defined by a lower wall, an upper wall, a rear opening (towards the radiator) carrying the opening (4), and a front opening (towards the air inlet).

Similarly, each side air-moving means (6A, 6B) may form a box.

The boxes are preferably made of plastic.

The side boxes (6A, 6B) are attached to the box (5) by any sealed means so as to prevent any air leaks. The boxes can therefore be glued, welded or overmoulded.

The three boxes (5, 6A and 6B) may form a single part, preferably made of plastic. Each box may consist of an assembly of different walls. Some of these walls forming the duct of the box may come from another element of the front surface such as the inner wall of the bumper skin, the FAT, a tank (windscreen washer, headlight washer), another bodywork element visible or not (wing subframe/convergent, presser, air inlet grid, trim, etc.), a shock absorber.

The boxes can be attached to the bumper of the front surface.

For example a box (5, 6A, 6B) may be substantially U-shaped, and the box can be closed by means of the inner wall of the bumper skin (2).

According to another embodiment (FIGS. 4A, 4B and 4C), the side cooling air inlet (11A, 11B) and the side aerodynamic air inlet (12A, 12B) are combined into a single air inlet (16).

To preserve the possibility of controlling the incoming air flow, in order to direct this air preferably towards the side air outlet (7A), or towards the intercooler, this air inlet (16) is provided with a scoop (17) that can be controlled by a control unit.

The scoop is designed so that in fully folded position, an opening remains, to allow air to enter the side air-moving means (6A).

The scoop is also designed so that in intermediate position, between a fully folded position and a fully open position, there remains an opening of xxxxx In fully open position, all the air entering through the inlet (16) is directed towards the intercooler.

This scoop (17) has, between these fully folded and fully open states, intermediate states, in order to precisely control the quantity of air sent from one side or the other, and therefore to favour or not cooling or aerodynamics.

The scoop (17) therefore directs a chosen quantity of air towards the side air outlet (7A) of the vehicle, or towards the intercooler.

Figure 4A:
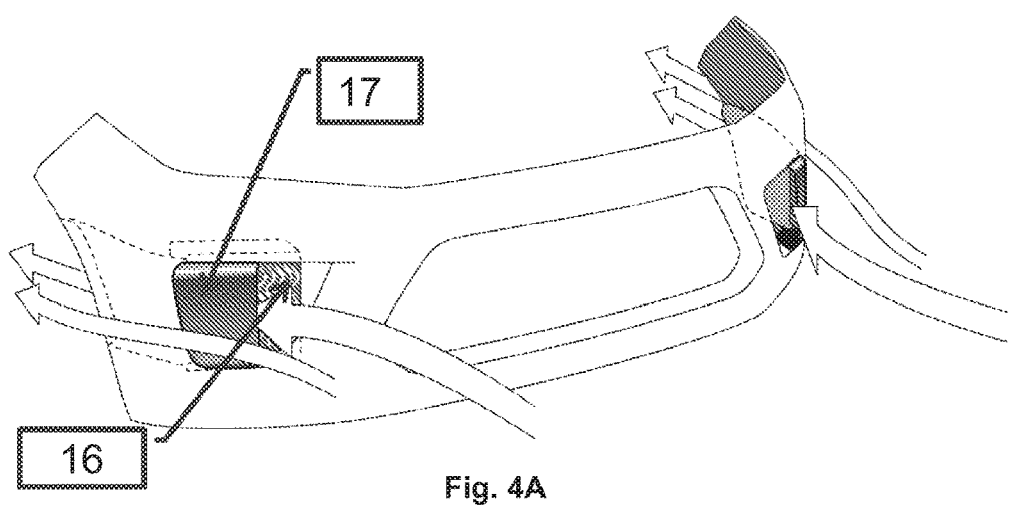
FIGS. 4A to 4C illustrate different opening and closing configurations of a scoop of a particular embodiment of an air flow control device according to the invention.
Figure 4B:
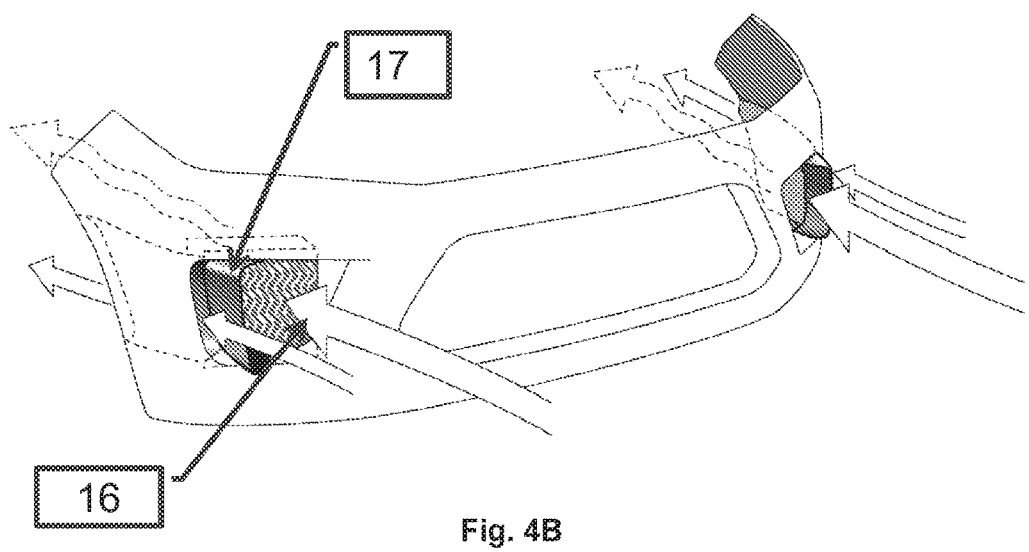
Figure 4C:
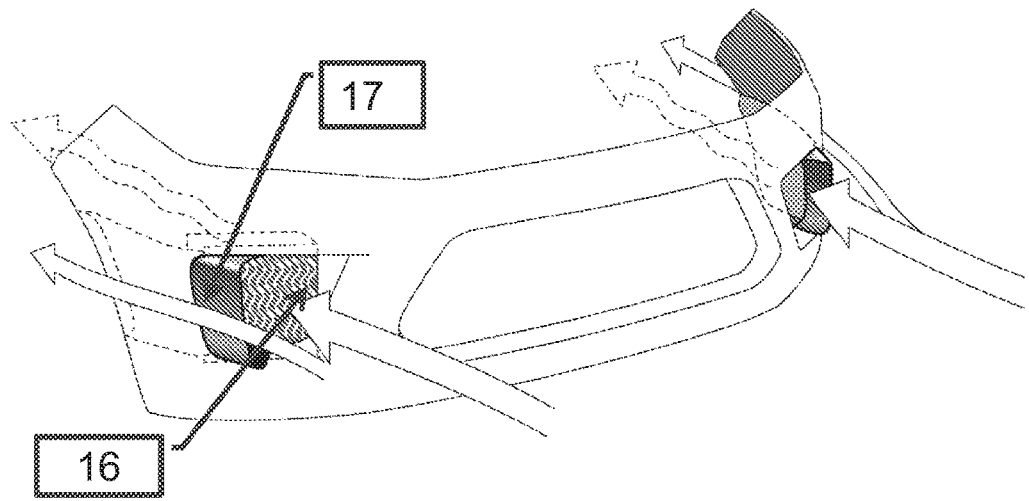

FIGS. 4A to 4C illustrate some of these configurations:
FIG. 4A illustrates a configuration in which the scoop (17) is fully folded. All the air is then evacuated towards the side air outlet (7A) of the vehicle, through the side air-moving means (6A) directing the air.
FIG. 4B illustrates a configuration in which the scoop (17) is partially open, leaving an unsealed side part. Some of the air is therefore evacuated towards the side air outlet (7A), and most of the air enters directly opposite the intercooler.
FIG. 4C illustrates a configuration in which the scoop (17) is fully open. All the air enters directly opposite the intercooler, no air leaves towards the side air outlet (7A).

The invention claimed is:

1. A motor vehicle front surface comprising:
a central air-moving device connected laterally to at least one side air-moving device configured to lead air from a central part of the front surface towards at least one side part of the vehicle,
said central air-moving device including a shutter configured to prevent air which entered through a central air inlet from entering a vehicle engine compartment, and
the front surface including at least a first valve between the central air-moving device and the at least one side air-moving device, the at least first valve being configured to adjust air flow circulating between the central air-moving device and the at least one side air-moving device,
the front surface further including a control device that moves the at least first valve and the shutter in opposite concert, such that when the at least first valve is closed, the shutter is open, and when the at least first valve is open, the shutter is closed,
wherein the at least one side air-moving device includes at least a second valve located between the at least first valve and a side air outlet, and air is directed to the vehicle engine compartment when the second valve is closed.

2. The motor vehicle front surface according to claim 1, wherein the at least first valve is located at an intersection between the central air-moving device and the at least one side air-moving device,
wherein when the at least first valve is closed, air from the central air-moving device cannot enter the at least one side air-moving device.

3. The motor vehicle front surface according to claim 1, comprising at least one first side air inlet located between the at least first valve and the second valve, and allowing air from outside the vehicle to directly enter the at least one side air-moving device to cool an intercooler.

4. The motor vehicle front surface according to claim 3, comprising at least one second side air inlet located between the second valve and the side air outlet, and allowing air from outside the vehicle to directly enter the at least one side air-moving device to improve aerodynamics of the vehicle.

5. The motor vehicle front surface according to claim 4, comprising a combined side air inlet, the combined side air inlet including a combination of the first side air inlet and the second side air inlet, the combined side air inlet allowing air from outside the vehicle to enter the at least one side air-moving device directly, the combined side air inlet being provided with a scoop that is configured to be adjusted to direct a chosen quantity of air towards a selected element of the side air outlet or the intercooler.

6. The motor vehicle front surface of claim 3, wherein a closed position of the second valve is a position where air is guided towards the intercooler.

7. The motor vehicle front surface according to claim 1, wherein the central air-moving device and the at least one side air-moving device form two plastic parts attached to each other so as to avoid any air leaks at a junction thereof.

8. The motor vehicle front surface according to claim 1, wherein the central air-moving device and the at least one side air-moving device form a same plastic part.

9. The motor vehicle front surface according to claim 1, wherein the central air-moving device and/or the at least one side air-moving device form boxes.

10. The motor vehicle front surface according to claim 9, comprising a skin intended to be visible from outside a motor vehicle, and in which at least one box is closed by an inner wall of the skin.

11. A vehicle comprising the motor vehicle front surface according to claim 1.

* * * * *